United States Patent
Herrig et al.

(10) Patent No.: US 11,268,491 B2
(45) Date of Patent: Mar. 8, 2022

(54) AERO-ELASTICALLY TAILORED WIND BLADE TIP JOINT

(71) Applicant: GENERAL ELECTRIC COMPANY, Schenectady, NY (US)

(72) Inventors: Andreas Herrig, Bavaria (DE); Thomas Merzhaeuser, Bavaria (DE)

(73) Assignee: General Electric Company, Schenectady, NY (US)

( * ) Notice: Subject to any disclaimer, the term of this patent is extended or adjusted under 35 U.S.C. 154(b) by 435 days.

(21) Appl. No.: 16/318,644

(22) PCT Filed: Aug. 11, 2016

(86) PCT No.: PCT/US2016/046608
§ 371 (c)(1),
(2) Date: Jan. 17, 2019

(87) PCT Pub. No.: WO2018/031024
PCT Pub. Date: Feb. 15, 2018

(65) Prior Publication Data
US 2019/0277248 A1 Sep. 12, 2019

(51) Int. Cl.
*F03D 1/06* (2006.01)
*F03D 7/02* (2006.01)

(52) U.S. Cl.
CPC ......... *F03D 1/0675* (2013.01); *F03D 7/0228* (2013.01); *F05B 2240/302* (2013.01); *Y02E 10/72* (2013.01)

(58) Field of Classification Search
CPC ... F03D 1/065; F03D 7/0228; F05B 2240/302
See application file for complete search history.

(56) References Cited

U.S. PATENT DOCUMENTS

| 4,083,651 A | 4/1978 | Cheney, Jr. et al. |
| H2057 H | 1/2003 | Veers et al. |

(Continued)

OTHER PUBLICATIONS

Nixon et al., "Aeroelastic tailoring for Stability Augmentation and Performance Enhancements of Tiltrotor Aircraft", pp. 1-18, http://www.cs.odu.edu/~mln/ltrs-pdfs/NASA-99-55ahs-mwn.pdf.

(Continued)

*Primary Examiner* — Kayla McCaffrey
(74) *Attorney, Agent, or Firm* — Dority & Manning, P.A.

(57) ABSTRACT

A wind turbine blade includes a first blade segment and a second blade segment extending in opposite directions from a chord-wise joint. The first blade segment includes a beam structure extending lengthways that structurally connects with the second blade segment at a receiving section, wherein the beam structure forms a portion of an internal support structure and includes a shear web connected with a suction side spar cap and a pressure side spar cap. The present technology also includes a joint rod located at a first end of the beam structure for connecting with the receiving section of the second blade segment to form a coupling joint about a joint axis. The coupling joint is coupled to an adjustable elastic support. The receiving section may further include a torque coupling positioned offset from the joint axis, such that a bending motion of the beam structure automatically induces a twist motion. A method of assembling the wind turbine blade is additionally disclosed.

20 Claims, 9 Drawing Sheets

(56) References Cited

U.S. PATENT DOCUMENTS

| | | | |
|---|---|---|---|
| 7,789,624 | B2 | 9/2010 | Appa et al. |
| 7,922,454 | B1* | 4/2011 | Riddell .................. F03D 80/30 |
| | | | 416/224 |
| 9,140,235 | B2 | 9/2015 | Vossler |
| 2011/0052403 | A1* | 3/2011 | Kawasetsu ............ F03D 1/0675 |
| | | | 416/226 |
| 2011/0091326 | A1* | 4/2011 | Hancock ............... F03D 1/0675 |
| | | | 416/225 |
| 2011/0142681 | A1 | 6/2011 | Fisher et al. |
| 2012/0269643 | A1* | 10/2012 | Hibbard ................ F03D 1/0675 |
| | | | 416/226 |
| 2012/0288371 | A1 | 11/2012 | Grabau et al. |
| 2013/0236321 | A1* | 9/2013 | Olthoff .................. F03D 1/065 |
| | | | 416/223 R |
| 2015/0369211 | A1 | 12/2015 | Merzhaeuser |

OTHER PUBLICATIONS

Jhonson et al., "Active Load Control Techniques for Wind Turbines", Sandia Report, pp. 1-132, Aug. 2008.

Ashwill, "Passive Load Control for Large Wind Turbines", 51st AIAA/ASME/ASCE/AHS/ASC Structures, Structural Dynamics, and Materials Conference, pp. 1-12, Apr. 12-15, 2010.

* cited by examiner

AERO-ELASTICALLY TAILORED WIND BLADE TIP JOINT

BACKGROUND

The present application relates generally to wind turbines and more particularly relates to an aero-elastically pitching wind blade tip joint for a wind turbine.

Most environment friendly energy sources presently available come from wind power that is considered to be one of the cleanest. Wind turbines generate electricity by effectively harnessing energy in the wind via a rotor having a set of rotor blades that turns a gearbox and generator, thereby converting mechanical energy to electrical energy that may be deployed to a utility grid. The construction of a modern wind turbine rotor blade generally includes skin or shell components, span-wise extending spar caps, and one or more shear webs.

In recent years, wind turbines for wind power generation have increased in size to achieve improvement in power generation efficiency and to increase the amount of power generation. Along with the increase in size of wind turbines for wind power generation, wind turbine rotor blades have also increased in size, for example, a minimum blade length of 40 meters. When the wind turbine rotor blade is increased in size as described above, various difficulties, such as a difficulty in integral manufacture and a difficulty in conveyance along with difficulties in transport, including securing roads and trucks, etc., occur.

In addition, as is generally understood, the loading on a rotor blade is a function of blade length, along with wind speed and turbine operating states. Thus, longer rotor blades may be subject to increased loading, particularly when a wind turbine is operating in high-speed wind conditions. Aero-elastic tailoring (AT) of the blade provides a means for addressing such loads. Conventional AT may include configuring the geometry of the blade, and more particularly, the sweep of the blade, to displace the center of pressure from a pitch axis, or by configuring the structural properties of the blades during layup, such as through off-axis fiber orientation coupling bend-twist via shell layup orthotropy and spar cap positioning, to address the loads. Each requiring complex configurations to achieve AT.

Therefore, there is a desire for a wind blade that is separated in a longitudinal direction for allowing easy handling and transportation, while providing for reduction of the increased loads of the blades through AT, and a method for assembling such a wind blade.

BRIEF DESCRIPTION

In accordance with an example of the present technology, a wind turbine blade is disclosed. The wind turbine blade includes a first blade segment and a second blade segment extending in opposite directions from a chord-wise joint. Each of the blade segments having a pressure side shell member, a suction side shell member, and an internal support structure. The first blade segment comprising a beam structure extending lengthways that structurally connects with the second blade segment at a receiving section. The beam structure forms a portion of the internal support structure and comprises a shear web connected with a suction side spar cap and a pressure side spar cap. A joint rod is located at a first end of the beam structure for connecting with the receiving section of the second blade segment to form a coupling joint about a joint axis. The coupling joint is coupled to an elastic support such that a bending motion of the beam structure automatically induces a twist motion.

In accordance with another example of the present technology, a wind turbine blade is disclosed. The wind turbine blade includes a first blade segment, a second blade segment and a joint assembly. The first blade segment having a pressure side shell member, a suction side shell member, an internal support structure and a beam structure extending in a span-wise direction. The second blade segment having a pressure side shell member, a suction side shell member, and an internal support structure. The first blade segment and the second blade segment extending in opposite directions from a chord-wise joint. The first blade segment is structurally connected via the beam structure to the second blade segment, to form a joint assembly. The joint assembly comprising a joint rod located at a first end of the beam structure for connecting with a receiving section of the second blade segment to form a coupling joint about a joint axis. The coupling joint is coupled to an adjustable elastic support, to provide at least one of movement and flexing of the coupling joint in a y-direction, such that a bending motion of the beam structure automatically induces a twist motion.

In accordance with another example of the present technology, a method of assembling a wind turbine blade. The method includes arranging a first blade segment and a second blade segment in opposite directions from a chord-wise joint. Each of the blade segments having a pressure side shell member, a suction side shell member, and an internal support structure. The method further comprising inserting a beam structure extending lengthways from the first blade segment into a receiving section of the second blade segment and attaching a free end of the beam structure with the receiving end of the second blade segment using a coupling joint and a bearing component. The coupling joint is coupled to an elastic support, to provide movement/flexing of the coupling joint in a y-direction, and a torque coupling positioned offset from a coupling joint axis, such that a bending motion of the beam structure automatically induces a twist motion.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Further, the terms "wind blade" and "rotor blade" are used interchangeably in the present invention. Any examples of operating parameters are not exclusive of other parameters of the disclosed embodiments.

Figure 1:
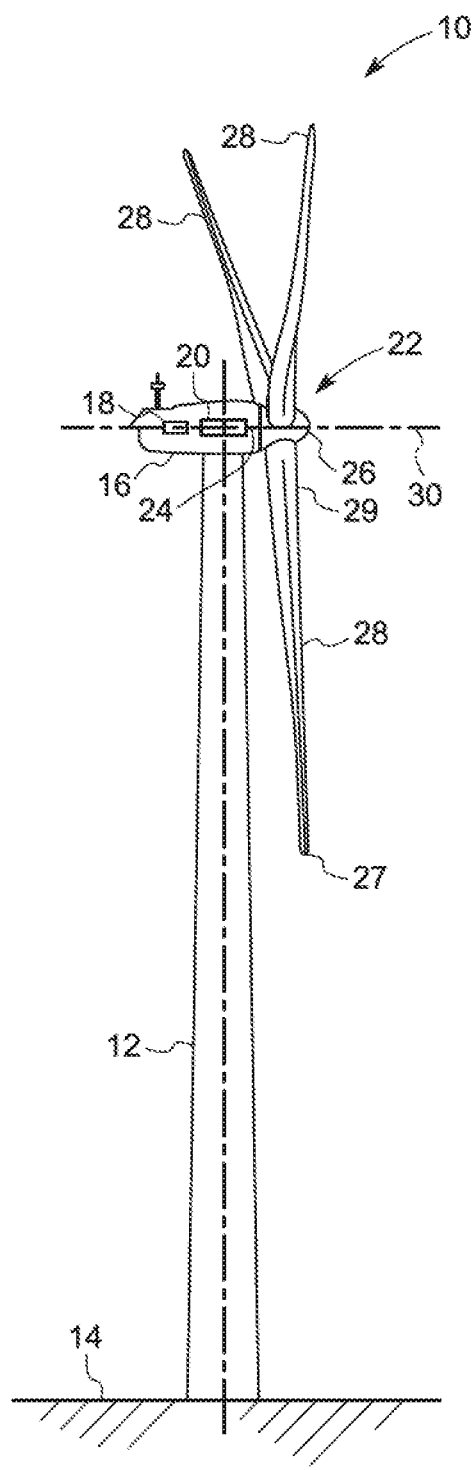
FIG. 1 is a side view of an exemplary wind turbine in accordance with an example of the present technology.

FIG. 1 is a side view of an exemplary wind turbine 10 in accordance with an embodiment of the present invention. In this embodiment, the wind turbine 10 is a horizontal-axis wind turbine. Alternatively, the wind turbine 10 may be a vertical-axis wind turbine. In the present embodiment, the wind turbine 10 includes a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. The rotor 22 includes a rotatable hub 26 and at least one rotor blade 28 coupled to and extending outward from the rotatable hub 26. As shown, the rotor blade 28 extends from a blade tip 27 to a blade root 29.

Figure 2:
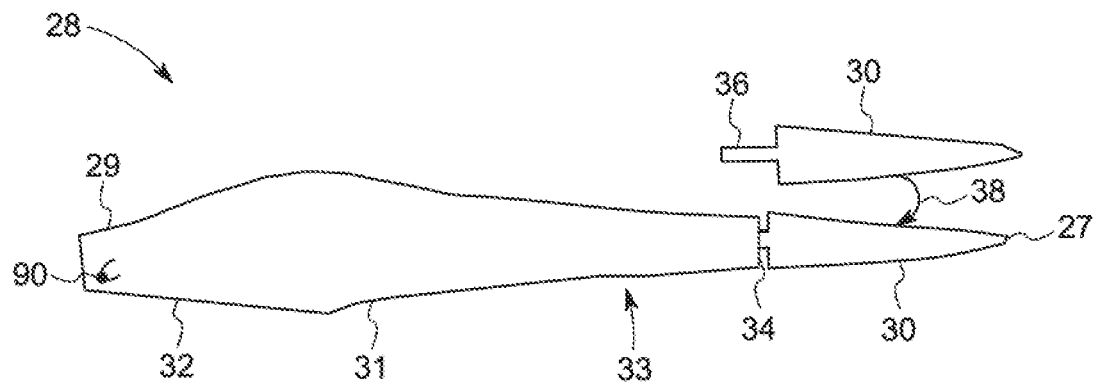
FIG. 2 is a plan view of a rotor blade having a first blade segment and a second blade segment, in accordance with one or more embodiments shown or described herein.

FIG. 2 is a plan view of a rotor blade 28 having a first blade segment 30 and a second blade segment 32 in accordance with an example of the present technology. The first blade segment 30 and the second blade segment 32 extend in opposite directions from a chord-wise joint 34. Each of the blade segments 30, 32 includes a pressure side shell member 31 and a suction side shell member 33. The first blade segment 30 and the second blade segment 32 are connected by at least one internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 20, 32 are joined by inserting the internal support structure 36 into the second blade segment 32.

Figure 3:
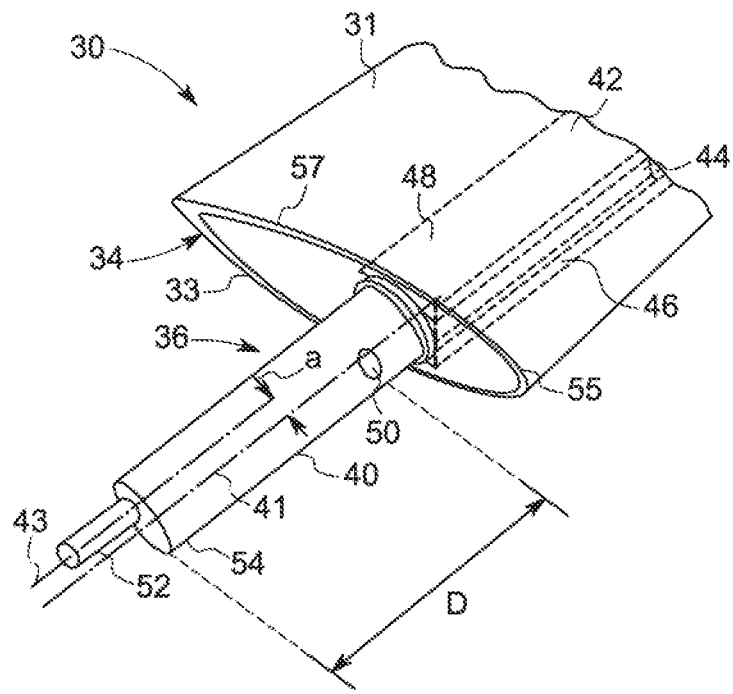
FIG. 3 is a perspective view of a section of the first blade segment, in accordance with one or more embodiments shown or described herein.

FIG. 3 is a perspective view of a section of the first blade segment 30 in accordance with an example of the present technology. The first blade segment 30 includes a beam structure 40 that forms a portion of the internal support structure 36 and extends lengthways for structurally connecting with the second blade segment 32. The beam structure 40 forms a part of the first blade segment 30 extending from a spar section 42. The beam structure 40 is disposed within, and more particularly, having formed thereabout, the pressure side shell member 31 and the suction side shell member 33. The spar section 42 further includes a shear web 44 connected with a suction side spar cap 46 and a pressure side spar cap 48.

Further, the first blade segment 30 includes a joint rod 52 towards a first end 54 of the beam structure 40. In a non-limiting example, the joint rod 52 is configured as a pin-like structure extending therefrom the first end 54 of the beam structure 40 and in a tight interference fit with a bush (not shown). In other non-limiting examples the joint rod 52 may be configured as a bolt or tube-like structure. As shown, the joint rod 52 is oriented in a span-wise direction. In the illustrated embodiment, the joint rod 52 is offset a dimension "a", measured from the axis 41 of the beam structure 40 to the axis 43 of the joint rod 52, where "a" is typically less than the width of the joint beam 40, but in an embodiment can be up to three times the width, respectively, half a length D of the joint beam 40. Offset of the joint rod 52 in chord-wise direction causes a pitching moment and deflection when the bending moment and deflection changes. The first blade segment 30 also includes a locking pin slot 50 located on the beam structure 40 proximate to the chord-wise joint 34. In other non-limiting examples there may be alternate means for maintaining attachment of the first blade segment 30 and the second blade segment 32. The locking pin slot 50 is oriented in a chord-wise direction. In one example, there may be a bushing within the locking pin slot 50 arranged in a tight interference fit with a bolt pin (described presently).

Figure 4:
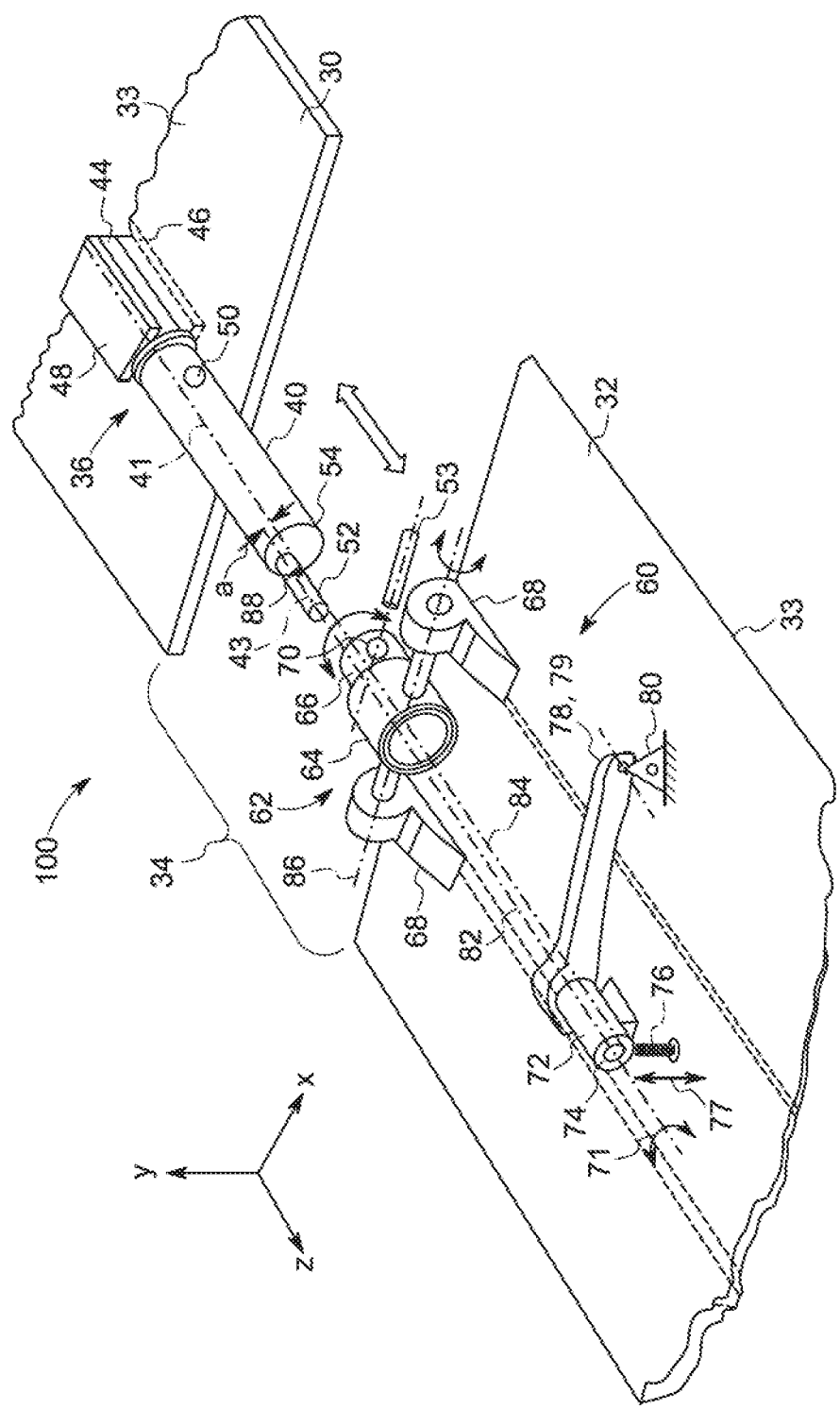
FIG. 4 is an exploded perspective view illustrating an assembly of the wind blade showing the first blade segment and the second blade segment, in accordance with one or more embodiments shown or described herein.
Figure 5:
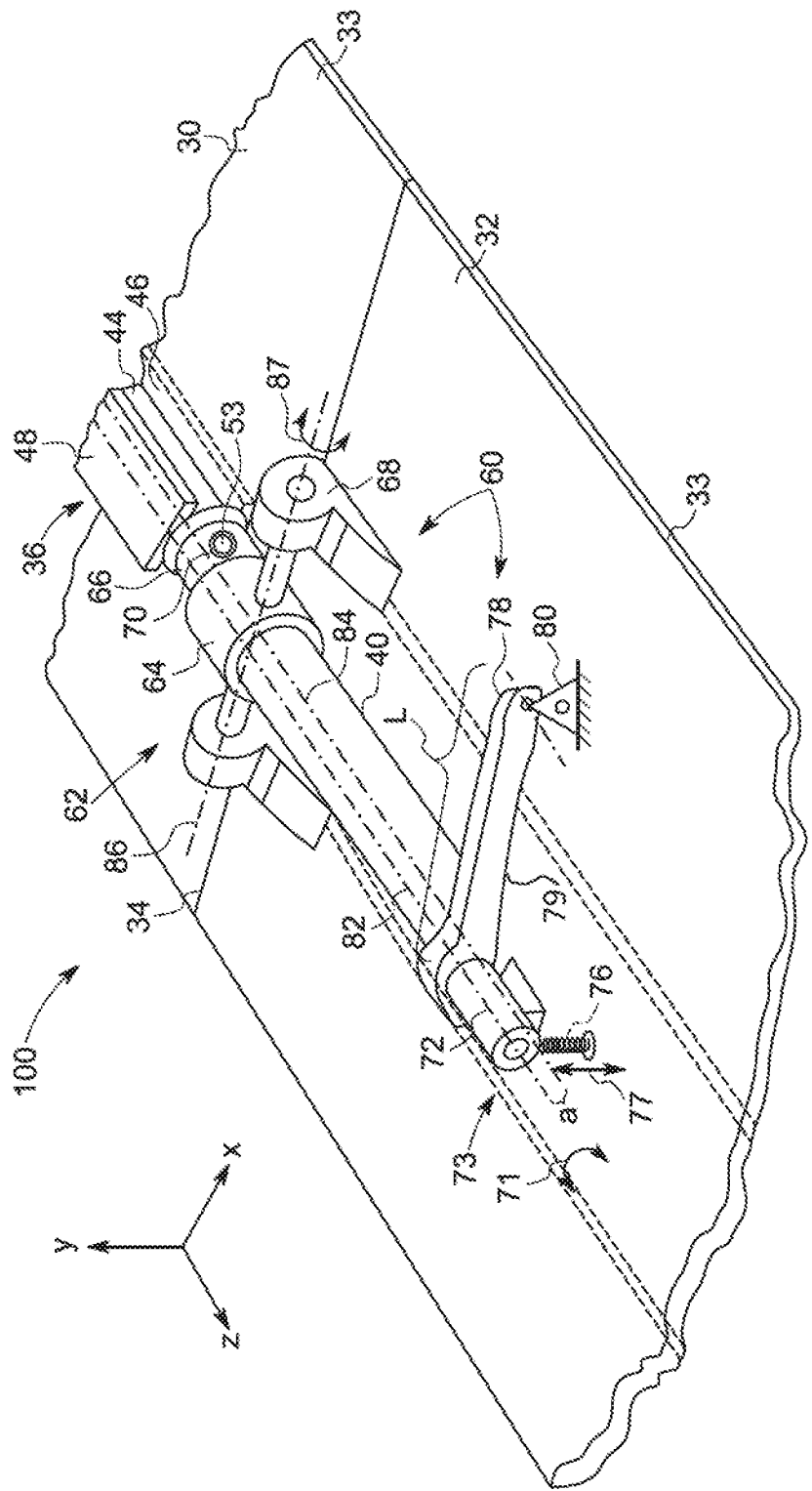
FIG. 5 is a perspective view illustrating an assembly of the wind blade depicted in FIG. 4 having the first blade segment joined with the second blade segment, in accordance with one or more embodiments shown or described herein.
Figure 6:
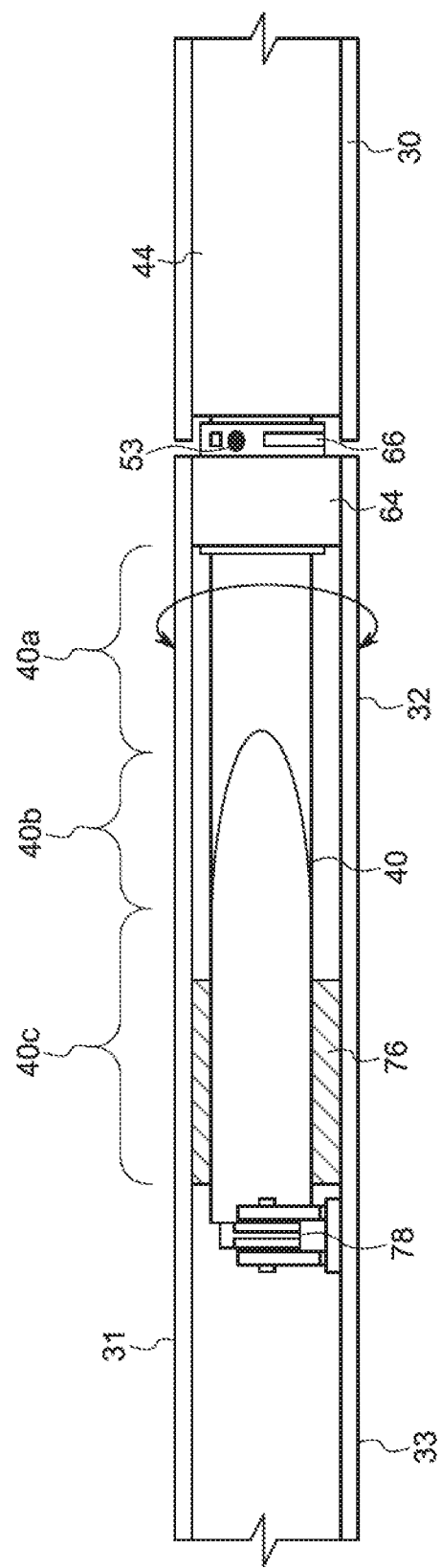
FIG. 6 is a simplified cross-sectional view of an alternate embodiment for the coupling joint of FIG. 5, in accordance with one or more embodiments shown or described herein.
Figure 7:
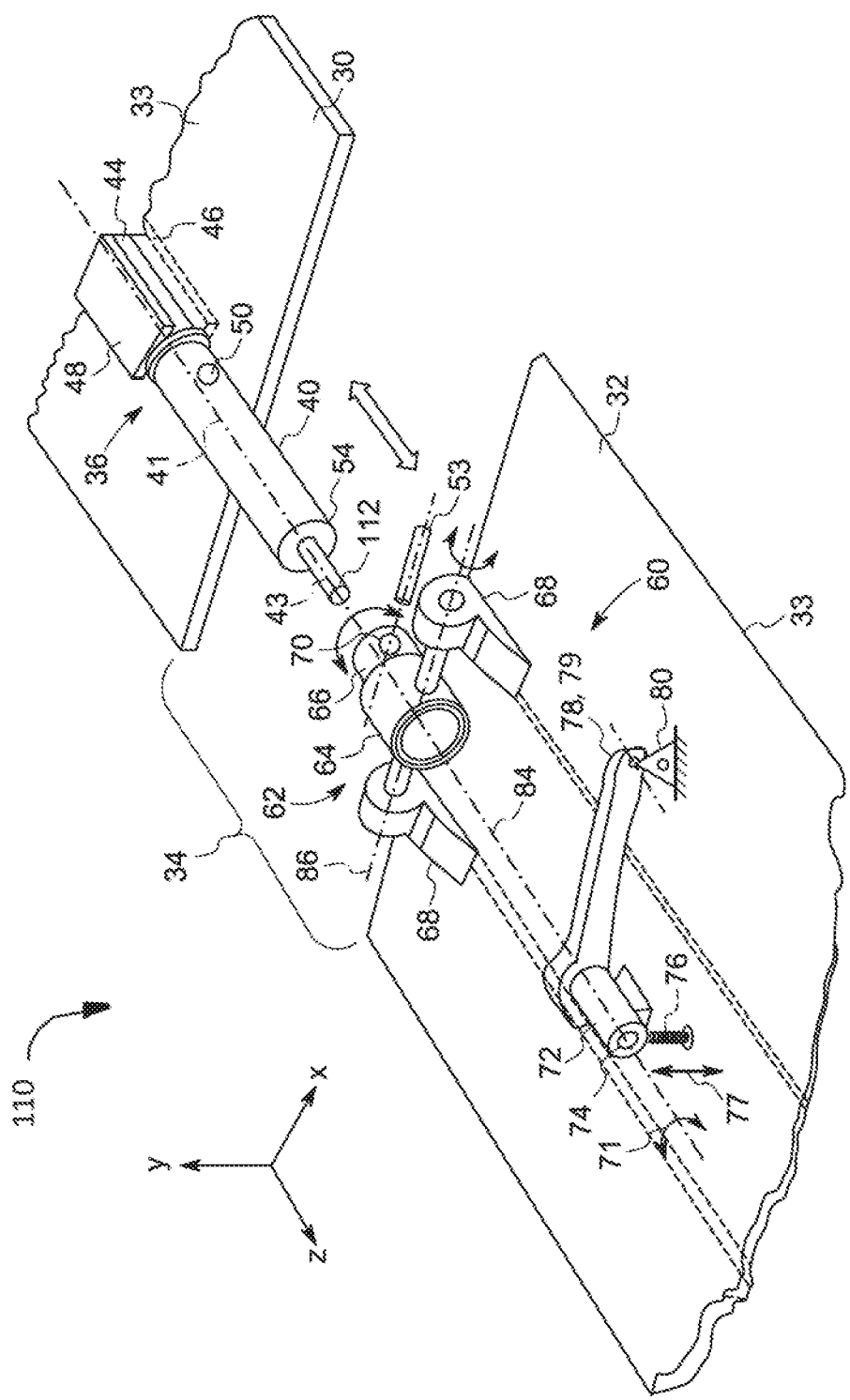
FIG. 7 is an exploded perspective view illustrating another embodiment of an assembly of the wind blade showing the first blade segment and the second blade segment, in accordance with one or more embodiments shown or described herein.
Figure 8:
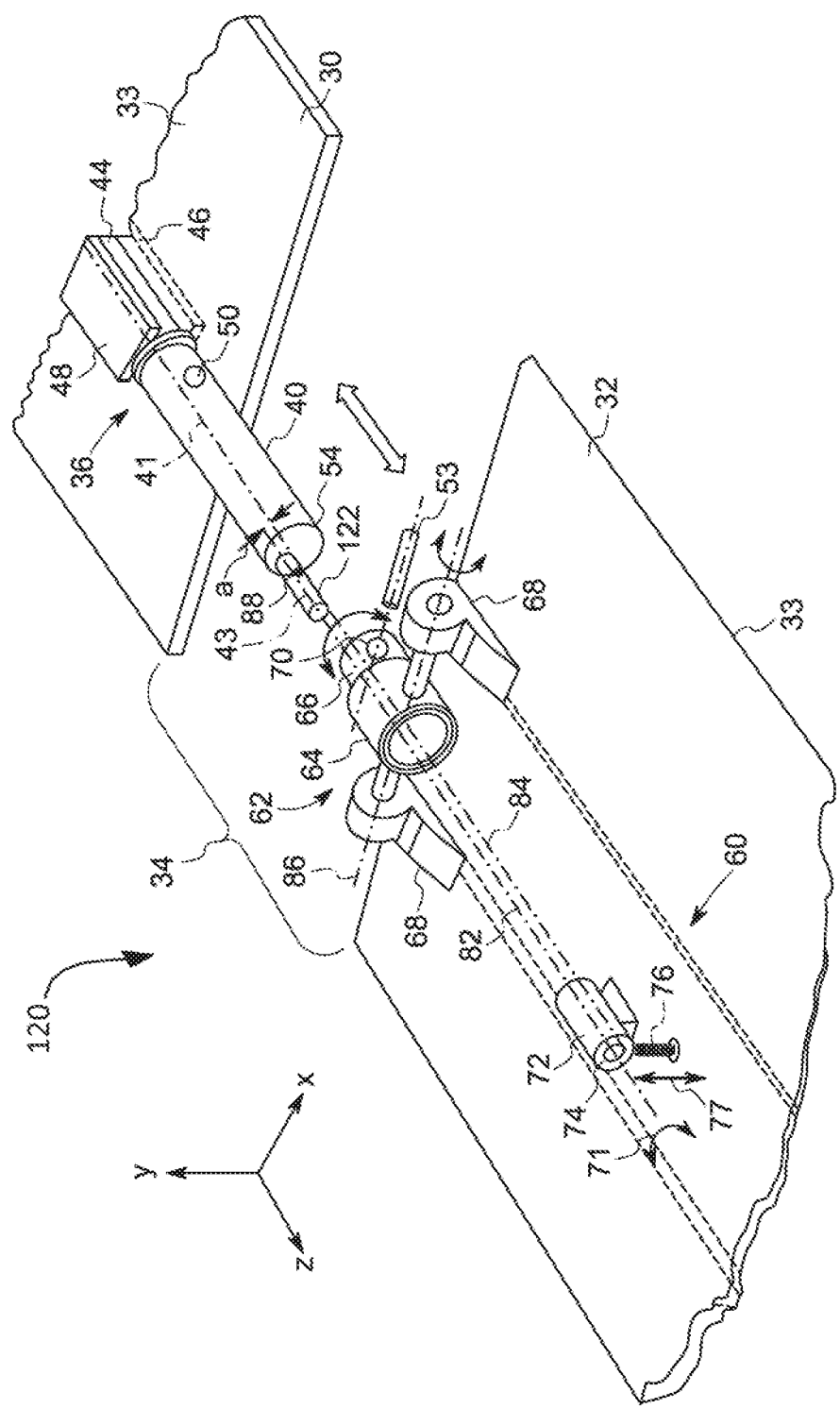
FIG. 8 is an exploded perspective view illustrating another embodiment of an assembly of the wind blade of the wind blade showing the first blade segment and the second blade segment, in accordance with one or more embodiments shown or described herein.

FIG. 4 is an exploded perspective view illustrating a section of the first blade segment 30 and a section of the second blade segment 32 at the chord-wise joint 34 in accordance with an example of the present technology. FIG. 5 illustrates the first blade segment 30 and second blade segment 32 after joining. FIGS. 6-8 illustrate alternate embodiment of the means for coupling the first blade segment 30 and the second blade segment 32. In the illustrated embodiments of FIGS. 4-8, only the suction side shell member 33 of each of the first blade segment 30 and the second blade segment 32 is shown, with the pressure side shell member 31 (FIG. 3) having been removed for illustration purposes.

Referring more specifically to FIGS. 4 and 5, in the illustrated embodiment, the second blade segment 32 shows a receiving section 60 extending lengthways within the second blade segment 32 for receiving the beam structure 40, including the joint rod 52, of the first blade segment 30. The receiving section 60 includes a bearing component 62 that extends in a span-wise direction for connecting with the beam structure 40, of the first blade segment 30. In the illustrated embodiment, the bearing component 62 includes a main joiner bearing 64, an inner joiner bearing sleeve 66 and a joiner bearing support bearing 68. It should be understood, that typically the joiner bearing support bearing 68 should be coupled to both the suction side 33 and pressure side 31 of the blade 28. For visualization purposes it is shown in the Figures coupled to only one side. The inner joiner bearing sleeve 66 includes a locking pin slot 70 in cooperative alignment with the locking pin slot 50 in the beam structure 40. As shown, the receiving section 60, and more particularly the bearing component 62, is configured to receive the beam structure 40, and includes the locking pin slot 70 that is aligned with the locking pin slot 50 of the beam structure 40 through which a locking pin 53 is inserted and remains in a tight interference fit such that the bearing component 62 and the beam structure 40 are joined together during assembling. The locking pin slots 50 and 70 provide for locking of the beam structure 40 within the receiving section 60 when fully assembled as best illustrated in FIG. 5. The locking pin 53 restrains movement of the first blade segment 30 relative to the second blade segment 32 in the z-direction. The bearing component 62 includes a rotation degree of freedom around the joint rod axis (z), a sliding degree of freedom along the y-axis, and if bending of the joint rod 52 to occur, a rotation around the x-axis.

The receiving section 60 further includes a joiner end support 72, having formed therein an opening 74 for cooperative receipt of the joint rod 52 of the beam structure 40, and so as to form a coupling joint 73 (FIG. 5) about a joint axis 82.

In an alternate embodiment as best depicted in FIG. 6, illustrating a portion of the first blade segment 30 and the second blade segment 32, the coupling joint may be formed by coupling the beam structure 40 to an elastic support, similar to elastic support 76, so as to allow for a similar degree of freedom in the most simplistic form. As illustrated in FIG. 6, in one particular embodiment, the beam structure 40 includes a substantially round portion 40a, that blends into a substantially rectangular portion 40c, defining a blend portion 40b. The round portion 40a being present at least over the portion of the circumference where the beam structure 40 is in contact with the bearing component 62. The rectangular portion 40c of the beam structure 40 thereby providing for direct coupling to an elastic support 76, such as an elastomer, pneumatic or metal spring, without the need for a joint rod, such as joint rod 52 of FIG. 5 to be formed on the beam structure 40.

Referring again to FIG. 5, in an embodiment, the joiner end support 72 provides for rotation of the joint rod 52 therein, as indicated by arrow 71, and may include a bushing or bearing sleeve (not shown) therein the opening 74. Accordingly, in one non-limiting example, the coupling joint 73 connecting the first and second blade segments 30, 32 may comprise an interference-fit steel bushed joint. The joiner end support 72 has coupled thereto an elastic support 76, such as a spring system 77, to provide movement/flexing of the joiner end support 72 in the y-direction, as indicated by arrow 77. In an embodiment, the elastic support 76 may be adjustable in stiffness, such as with a shiftable leaf spring to allow for varying of the bend-twist coupling provided by the joiner end support 72. The receiving section 60 further includes a torque coupling 78 that may be adjustable in height and/or distance via adjustment component 80 for trimming static twist and twist response. By shifting it in the y-direction, the twist distribution, i.e. the mean pitch difference between the blade segment and the tip can be adjusted. By shortening/lengthening the torque coupling 78, and more particularly the lever arm 79, the coupling between the bending deflection and respective twist change can be tuned to the current operating conditions. For example, when running the rotor at low rotational speeds, less twist may be desirable, whereas in load critical situations a stronger coupling could be needed. To avoid suboptimal twist distributions (potentially too much to power/high angle of attack) at the low speeds, an according "static"/mean twist shift by the shift of the arm support can be realized.

FIG. 5 illustrates a joint assembly 100 of the wind blade 28 having the first blade segment 30 joined with the second blade segment 32 in accordance with an example of the present technology. In this example, the assembly 100 illustrates the first blade segment 30 joined with the second blade segment 32 at joint 34. As shown, the receiving section 60 includes the bearing component 62, the joiner end support 72 and the torque coupling 78 supporting the beam structure 40.

In an embodiment, the beam structure 40 and the bearing sleeve 66 may be joined together using a suitable adhesive material or an elastomeric support. In an embodiment, a clamping mechanism may further be included. In a further embodiment, a sensor element 88 (FIG. 4) may be disposed relative to the joint rod 52 to provide for the receiving and sending of signals to a control unit (not shown) of the wind turbine 10 (as shown in FIG. 1), which signals may enable sensing multiple parameters including blade loads or stresses. In yet another embodiment, a sensor element 90 (FIG. 2) may be disposed relative to the blade root 29 to provide for the receiving and sending of signals to a control unit (not shown) of the wind turbine 10 (as shown in FIG. 1), which signals may enable sensing multiple parameters including blade loads or stresses. Sensors 88 and 90 may help in effective operation of the wind turbine 10 (shown in FIG. 1).

In the illustrated embodiment, the joint assembly is used to implement aero-elastic tailoring (AT) capabilities without the disadvantages of typical swept AT blades with bend-twist coupling created via shell layup orthotropy and/or spar cap positioning. In addition, instead of a mechanical based pitching joint, the joint assembly 100 achieves pitching of the blade by a bearing system, which is easier to integrate in a blade with a flexible connection, such as chord-wise joint 34 The joint assembly 100 integrates bend-twist coupling, including adjustable stiffness.

As previously alluded to, the assembly joints, where the beam structure 40 meets the bearing component 62 and the joint rod 52 meets the end support 72, can be elastically supported, with a torque coupling 78, such as torque arm/lever arm, placed offset from a joint axis 82, such that a bending motion automatically induces a twist motion. Furthermore, by changing the stiffness of the elastic support 76 and/or the joint rod offset "a", a length "L" of the torque coupling 78, and more particularly the torque arm/lever arm 79, can be used to adapt the bend-twist coupling response to the blade operating conditions. It will also enable different bend-twist responses for the bending direction towards the pressure and suction side shells 31, 33, e.g. via limiting stops, which can help in balancing operational and shutdown load cases.

During operation, a flapwise bending load on the tip 27 (FIG. 2) of the rotor blade 28 creates a bending moment on the beam structure 40, including the joint rod 52. As the beam structure 40 is supported elastically via the elastic support 76 allowing it to flex in the flapwise direction, the bending deflection resulting from the flapwise load can be used to create a torsional deflection at the same time. For this, the beam structure 40 may rotate inside the blade 28, i.e. the main joiner bearing component 62 and the joiner end support 72 allow rotation around a spanwise axis 84 and a chordwise axis 86, simultaneously. In an embodiment, centrifugal loads are absorbed by the main joiner bearing component 62.

Functionally, as the blade tip 27 (FIG. 2) bends up and the main joiner bearing component 62 rotates around the chord-wise axis 86, as indicated by arrow 87, and the elastic support 76 coupled to the joiner end support 72 allows the blade 28 to flex downward in a y-direction, as indicated at 77. The fixation of the torque arm/lever arm 79 in the blade 28 at the same time creates a torsional motion around the joiner spanwise axis 84, as indicated at 71, which is allowed by the main joiner bearing component 62. The coupling ratio can be adjusted by the length "L" of the torque arm/lever arm 79, whereas the amount of flexing can be controlled by the stiffness of the elastic support 76 in relation to the beam structure length. In an embodiment, the static twist position may be adjusted by changing the support position of the torque arm/lever arm 79, or the geometry of the torque arm/lever arm 79, thus rotating the tip 27 to a different angle.

The joint assembly 100 may be configured to be completely passive, having a load-deformation relation which is not necessarily linear, but practically fixed. Alternatively, the load-deformation relation may be adjusted by changing the effective stiffness of the support system (change of moment arm via the elastic support 76 with an actuator (not shown), change in stiffness of the elastic support 76 (air or hydraulic spring, etc.) or a tip actuation arm length can be changed to modify the angular response for the same bending deflection.

Figure 9:
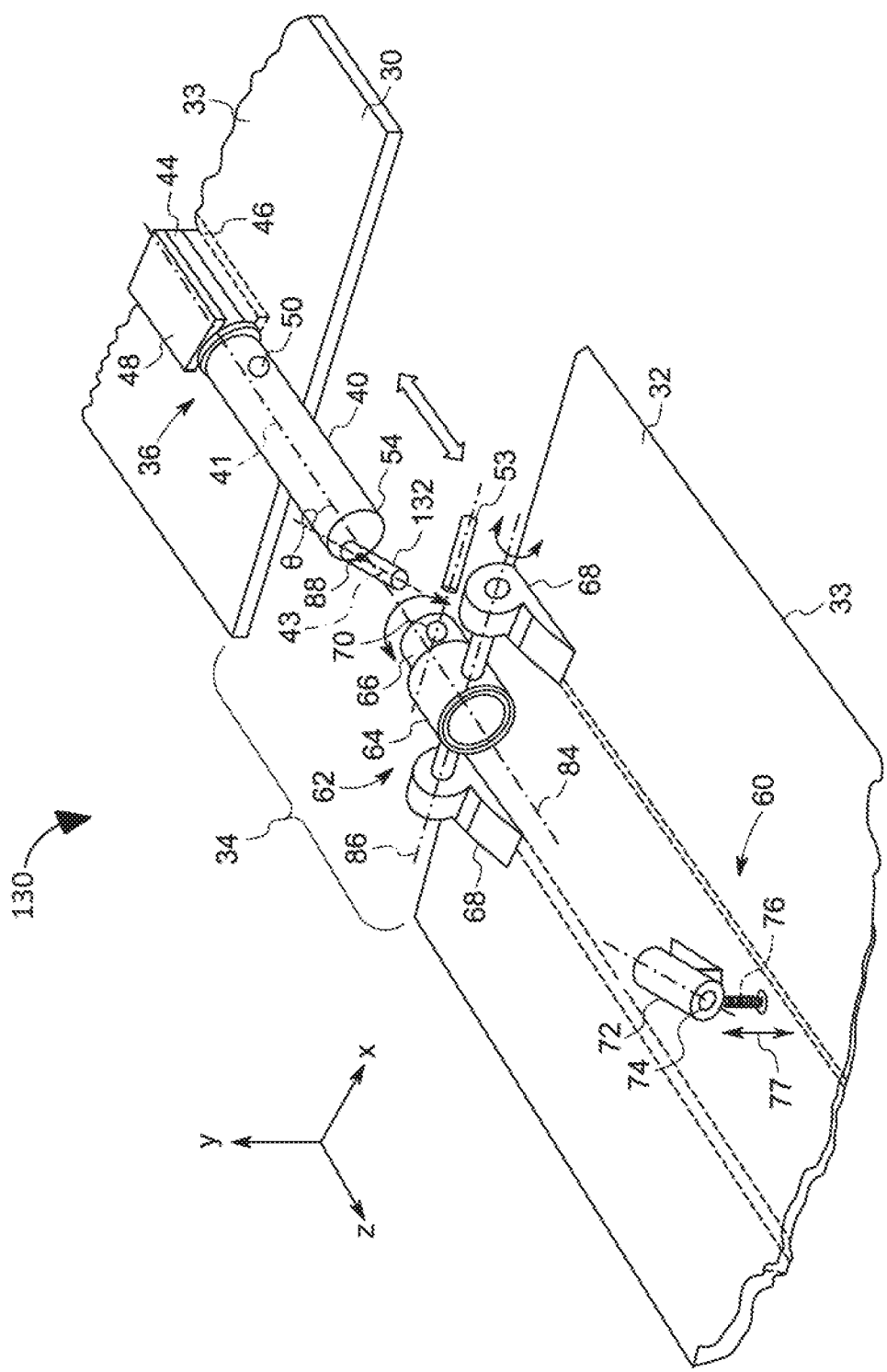
FIG. 9 is an exploded perspective view illustrating another embodiment of an assembly of the wind blade of the wind blade showing the first blade segment and the second blade segment, in accordance with one or more embodiments shown or described herein.

Referring now to FIGS. 7-9, illustrated in exploded perspective views are alternate embodiments of a joint assembly, referenced 110, 120 and 130. It should be understood that for ease of illustration, the same numerals may be used to indicate similar elements in the figures and that similar elements will not be explained for each of FIGS. 7-9, that were previously explained in FIGS. 4-6.

Referring more specifically to FIG. 7, illustrated is an alternate joint assembly 110 in which the first blade segment 30 includes a joint rod 112 towards a first end 54 of the beam structure 40. In a non-limiting example, the joint rod 112 is configured as a pin-like structure extending therefrom the first end 54 of the beam structure 40 and in a tight interference fit with a bush (not shown). In other non-limiting examples the joint rod 112 may be configured as a bolt or tube-like structure. As shown, the joint rod 112 is oriented in a span-wise direction. In contrast to the previous embodiment of FIGS. 4 and 5, in this particular embodiment the axis 43 of the joint rod 112 is aligned with the axis 41 of the beam structure 40. Offset of the joint rod 112 in chord-wise direction is not required, with the torque arm/lever arm 79 providing a similar effect as the offset.

Similar to the previous embodiment, the receiving section 60 further includes a joiner end support 72, having formed therein an opening 74 for cooperative receipt of the joint rod 112 of the beam structure 40, and so as to form a coupling joint 73 (FIG. 5) about a joint axis 82. In an embodiment, the joiner end support 72 provides for rotation of the joint rod 112 therein, as indicated by arrow 71, and may include a bushing or bearing sleeve (not shown) therein the opening 74. The joiner end support 72 has coupled thereto an elastic support 76, such as a spring system 77, to provide movement/flexing of the joiner end support 72 in the y-direction, as indicated by arrow 77. The receiving section 60 further includes a torque coupling 78, such as a torque arm/lever arm 79 that may be adjustable in height and/or distance via adjustment component 80 for trimming static twist and twist response. By shifting it in the y-direction, the twist distribution, i.e. the mean pitch difference between the blade segment and the tip can be adjusted. By shortening/lengthening the torque arm/lever arm 79, the coupling between the bending deflection and respective twist change can be tuned to the current operating conditions.

Referring more specifically to FIG. 8, illustrated is another alternate joint assembly 120 in which the first blade segment 30 includes a joint rod 122 towards a first end 54 of the beam structure 40. In a non-limiting example, the joint rod 122 is configured as a pin-like structure extending therefrom the first end 54 of the beam structure 40 and in a tight interference fit with a bush (not shown). In other non-limiting examples the joint rod 122 may be configured as a bolt or tube-like structure. As shown, the joint rod 122 is oriented in a span-wise direction. Similar to the embodiment of FIGS. 4 and 5, in this particular embodiment the axis 43 of the joint rod 112 is offset a dimension "a", measured from the axis 41 of the beam structure 40 to the axis 43 of the joint rod 122. Offset of the joint rod 122 in chord-wise direction causes a pitching moment and deflection when the bending moment and deflection changes.

Similar to the previous embodiments, the receiving section 60 further includes a joiner end support 72, having formed therein an opening 74 for cooperative receipt of the joint rod 112 of the beam structure 40, and so as to form a coupling joint 73 (FIG. 5) about a joint axis 82. In an embodiment, the joiner end support 72 provides for rotation of the joint rod 112 therein, as indicated by arrow 71, and may include a bushing or bearing sleeve (not shown) therein the opening 74. The joiner end support 72 has coupled thereto an elastic support 76, such as a spring system 77, to provide movement/flexing of the joiner end support 72 in the y-direction, as indicated by arrow 77. As previously indicated, in this particular embodiment, the receiving section 60 does not include a torque coupling, such as a torque coupling 78, and instead relies on the offset of the joint rod 112 to provide for trimming static twist and twist response.

Lastly, in an embodiment depicted in FIG. 9, illustrated is another alternate joint assembly 130 in which the first blade segment 30 includes a joint rod 132 towards a first end 54 of the beam structure 40. In a non-limiting example, the joint rod 132 is configured as a pin-like structure extending therefrom the first end 54 of the beam structure 40 and in a tight interference fit with a bush (not shown). In other non-limiting examples the joint rod 132 may be configured as a bolt or tube-like structure. As shown, the joint rod 132 is oriented in a span-wise direction. In contrast to the previous embodiments, in this particular embodiment the joint beam structure 40 is in a skewed configuration by sweeping the beam structure 40 away from the spanwise axis 84, and more particularly the axis 41 of the beam structure 40 is skewed a distance "θ", where θ is between 0° to approximately 30°, depending on the amount of coupling created. An offset "a" of the joint rod 132 in this manner causes a pitching moment and deflection when the bending moment and deflection changes. In an embodiment, the coupling may be reversed, i.e. pitching to power with an increasing load.

Similar to the previous embodiments, the receiving section 60 further includes a joiner end support 72, having formed therein an opening 74 for cooperative receipt of the joint rod 132 of the beam structure 40, and so as to form a coupling joint 73 (FIG. 5) about a joint axis 82. In an embodiment, the joiner end support 72 provides for rotation of the joint rod 132 therein, as indicated by arrow 71, and may include a bushing or bearing sleeve (not shown) therein the opening 74. The joiner end support 72 has coupled thereto an elastic support 76, such as a spring system 77, to provide movement/flexing of the joiner end support 72 in the y-direction, as indicated by arrow 77. In this particular embodiment, the receiving section 60 does not include a torque coupling, such as torque coupling 78, and instead relies on the offset of the joint rod 132 to provide for trimming and twist response.

It should be understood that while specific embodiment configurations are described and illustrated, the interchangeability of various features from different embodiments is anticipated herein.

Figure 10:
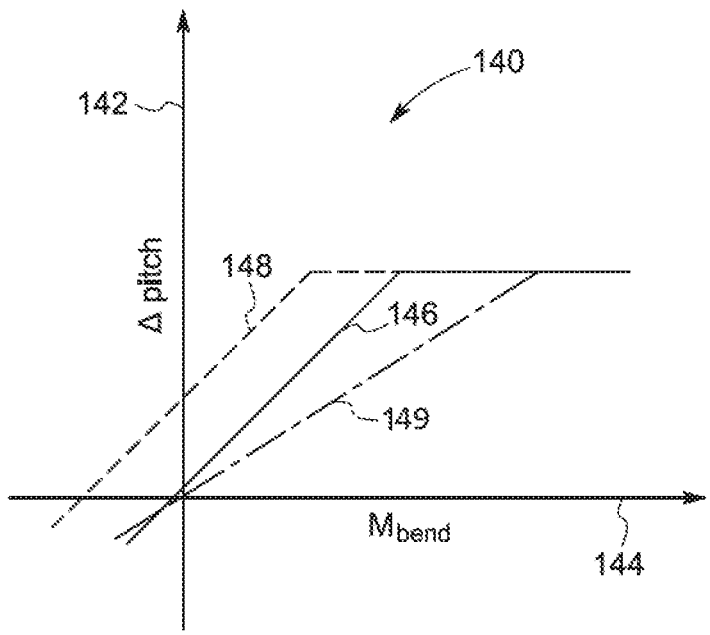
FIG. 10 is an exemplary graphical representation illustrating change in pitch response with varying bending loads.

Illustrated in FIG. 10 by graphical representation 140 are the trends in pitch response (plotted in axis 142) with varying bending loads of the blade tip portion (plotted in axis 144), illustrating how a pitch response of the rotor blade tip depends on the tip flap deflection and how it can be tuned. When the rotor blade undergoes variations in a bending load, the delta pitch will move along one of the curves accordingly until it reaches a limit value which may be given by the geometric characteristics of the system. Plotted line 146 illustrates a normal pitch response, characteristic for an untunable system. Plotted line 148 illustrates a pitch response shifted to a more positive value by movement of the elastic support 76 and/or lever arm 80 (described presently). Plotted line 149 illustrates a reduced pitch response by stiffening of the elastic support 76 and/or shortening of the lever arm 80 (described presently).

As previously alluded to, schematic dependency of the delta pitch (respectively the twist change at the coupling joint 73) relies on the tip flapwise bending moment. In an embodiment, the torque arm/lever arm 79 may be adjustable in height and/or distance via adjustment component 80 for trimming static twist and twist response. By shifting it in the y-direction, the twist distribution, i.e. the mean pitch difference between the tip (first blade segment 30) and the second blade segment 32 can be adjusted. The coupling between the bending deflection and respective twist change can be tuned to the current operating conditions by shortening/lengthening the torque arm/lever arm 79. For example, when running the rotor at low rotational speeds, less twist response may be desirable, whereas in load critical situations a stronger coupling could be needed. To avoid suboptimal twist distributions (potentially too much to power/high angle of attack) at the low speeds, an according "static"/mean twist shift by the shift of the lever arm support can be realized. In addition to the adjustments of the lever arm by adjustment component 80, the stiffness and location of the elastic support 76 may be adjustable, (e.g. when using a pneumatic spring, it could be pumped up, which couples the stiffness to the static twist offset).

There may be a limit to which the joint rod can deflect before colliding with the spar caps. Respectively the motion of the elastic support 76 may be restricted or the pitch angle cannot exceed certain values. That will impose a pitch limit. Strictly speaking, shift of the elastic support 76 will impact the pitch limit. In an embodiment, the elastic support 76 is not linear, resulting in the rising slopes being curved.

Figure 11:
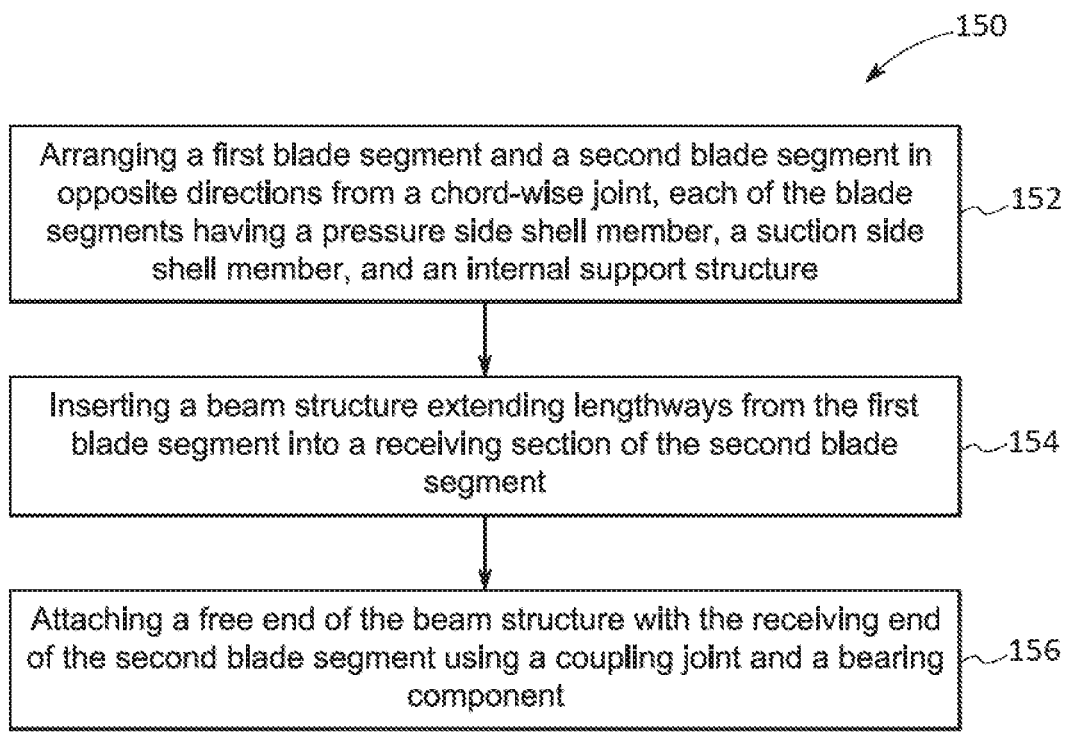
FIG. 11 is a flow chart of a method of assembling a wind turbine blade, in accordance with one or more embodiments shown or described herein.

Referring not to FIG. 11, illustrated is a flow chart 150 of a method of assembling a wind turbine blade in accordance with an example of the present technology. At step 152, the method includes arranging a first blade segment and a second blade segment in opposite directions from a chord-wise joint, each of the blade segments having a pressure side shell member, a suction side shell member, and an internal support structure. At step 1454, the method also includes inserting a beam structure extending lengthways from the first blade segment into a receiving section of the second blade segment. Further at step 156, the method includes attaching a free end of the beam structure within the receiving section of the second blade segment using a coupling joint and a bearing component.

Advantageously, the present technology ensures efficient reduction of connecting loads, leading to simplified moment flow between the multiple supporting structures of the wind blade, while providing aero-elastic tailoring of the blade. Further, the present technology ensures low cost, reliable, and scalable connections. Due to the customizable blade geometry and segmented blade parts, there is reduction in transportation costs. Furthermore, the easy handling and assembling of the wind blade leads to reduction of turbine down time during wind blade maintenance.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine blade comprising:
   a first blade segment and a second blade segment extending in opposite directions from a chord-wise joint, each of the blade segments having a pressure side shell member, a suction side shell member, and an internal support structure;
   the first blade segment comprising a beam structure extending lengthways that structurally connects with the second blade segment at a receiving section, wherein the beam structure forms a portion of the internal support structure and comprises a shear web connected with a suction side spar cap and a pressure side spar cap;
   a joint rod located at a first end of the beam structure for connecting with the receiving section of the second blade segment to form a coupling joint about a joint axis, wherein the coupling joint is coupled to an elastic support such that a flapwise bending motion of the beam structure automatically induces a twist motion of the beam structure.

2. The wind turbine blade of claim 1, wherein the receiving section of the second blade segment comprises a bearing component extending in a span-wise direction for receiving the beam structure.

3. The wind turbine blade of claim 2, wherein the bearing component includes a main joiner bearing, an inner joiner bearing sleeve and a joiner bearing support bearing.

4. The wind turbine blade of claim 3, wherein the inner joiner bearing sleeve includes a locking pin slot in cooperative alignment with a locking pin slot in the beam structure.

5. The wind turbine blade of claim 4, wherein a locking pin disposed in the inner joiner bearing sleeve locking pin slot and the beam structure locking pin slot restrains movement of the first blade segment relative to the second blade segment in a z-direction.

6. The wind turbine blade of claim 1, wherein the coupling joint is oriented in a span-wise direction and comprises a joiner end support, having formed therein an opening for cooperative receipt of the joint rod.

7. The wind turbine blade of claim 6, wherein the joiner end support has coupled thereto the elastic support, the joiner end support configured to flex in a y-direction.

8. The wind turbine blade of claim 7, wherein the elastic support is adjustable in stiffness.

9. The wind turbine blade of claim 1, wherein the receiving section of the second blade segment further comprises a torque coupling positioned offset from the joint axis.

10. The wind turbine blade of claim 9, wherein the torque coupling is adjustable in at least one of height and distance via an adjustment component for timing static twist and twist response.

11. The wind turbine blade of claim 9, wherein the torque coupling is an adjustable leaver arm.

12. The wind turbine blade of claim 1, wherein the joint rod is offset a dimension "a", measured from an axis of the beam structure to an axis of the joint rod.

13. The wind turbine blade of claim 1, wherein an axis of the joint rod is aligned with an axis of the beam structure.

14. A wind turbine blade, comprising:
a first blade segment having a pressure side shell member, a suction side shell member, an internal support structure and a beam structure extending in a span-wise direction;
a second blade segment having a pressure side shell member, a suction side shell member, and an internal support structure, the first blade segment and the second blade segment extending in opposite directions from a chord-wise joint;
wherein the first blade segment is structurally connected via the beam structure to the second blade segment, to form a joint assembly, the joint assembly comprising;
a joint rod located at a first end of the beam structure for connecting with a receiving section of the second blade segment to form a coupling joint about a joint axis,
wherein the coupling joint is coupled to an adjustable elastic support, to provide at least one of movement and flexing of the coupling joint in a y-direction, such that a bending motion of the beam structure automatically induces a twist motion.

15. The wind turbine blade of claim 14, wherein the receiving section of the second blade segment comprises a bearing component positioned offset from the coupling joint axis and extending in a span-wise direction for receiving the beam structure.

16. The wind turbine blade of claim 15, wherein the bearing component includes a main joiner bearing, an inner joiner bearing sleeve and a joiner bearing support bearing, wherein the inner joiner bearing sleeve includes a locking pin slot in cooperative alignment with a locking pin slot in the beam structure and having a locking pin disposed therein so as to restrain movement of the first blade segment relative to the second blade segment in a z-direction.

17. The wind turbine blade of claim 14, wherein the coupling joint is oriented in a span-wise direction and comprises a joiner end support, having formed therein an opening for cooperative receipt of the joint rod.

18. The wind turbine blade of claim 14, wherein the receiving section further comprises a torque coupling that is adjustable in at least one of height and distance via an adjustment component, for timing static twist and twist response.

19. A method of assembling a wind turbine blade, the method comprising:
arranging a first blade segment and a second blade segment in opposite directions from a chord-wise joint, each of the blade segments having a pressure side shell member, a suction side shell member, and an internal support structure;
inserting a beam structure extending lengthways from the first blade segment into a receiving section of the second blade segment; and
attaching a free end of the beam structure with the receiving section of the second blade segment using a coupling joint and a bearing component,
wherein the coupling joint is coupled to an elastic support, to provide movement/flexing of the coupling joint in a y-direction, and a torque coupling positioned offset from a coupling joint axis, such that a bending motion of the beam structure automatically induces a twist motion.

20. The method of assembling a wind turbine blade of claim 19, wherein the coupling joint is oriented in a span-wise direction and about the coupling joint axis, and offset from a beam structure axis, such that a bending motion of the beam structure automatically induces a twist motion.

* * * * *